De W. C. MEEKER.
HAME-FASTENER.

No. 176,753.  Patented May 2, 1876.

WITNESSES:
J. Wm Garner
G. Walter Gibbous

INVENTOR:
DeWitt C. Meeker
per
F. A. Lehmann, Atty

UNITED STATES PATENT OFFICE.

DE WITT C. MEEKER, OF COLUMBUS, OHIO.

IMPROVEMENT IN HAME-FASTENERS.

Specification forming part of Letters Patent No. 176,753, dated May 2, 1876; application filed March 20, 1876.

*To all whom it may concern:*

Be it known that I, DE WITT C. MEEKER, of Columbus, Franklin county, Ohio, have invented a Hame-Lock, of which the following is a specification:

My invention relates to an improvement in locks for hames; and it consists in the arrangement and combination of parts that will be more fully described hereinafter, whereby the ends of the hames can be quickly and securely fastened together, and as easily unfastened.

Figure 1:
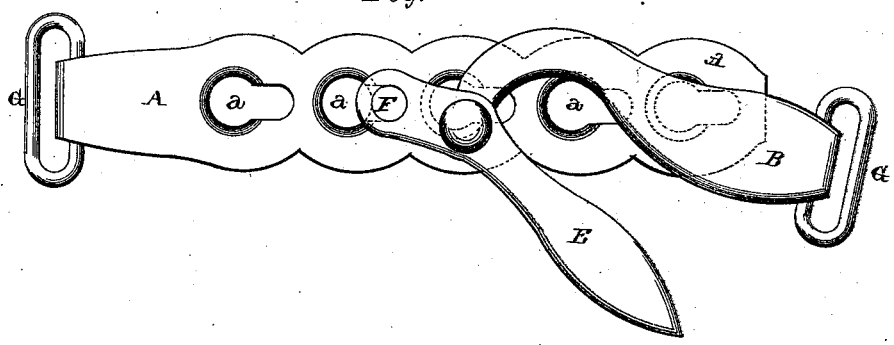
Figure 2:
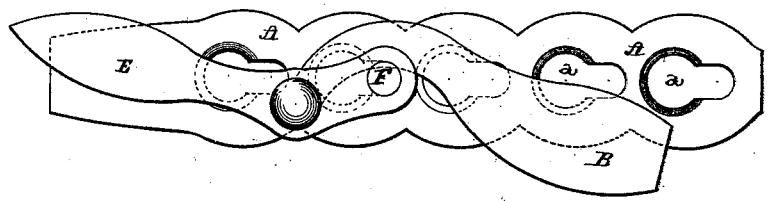
Figure 3:
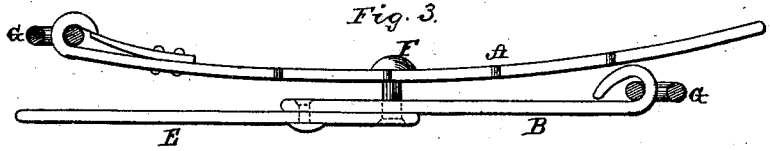
Figure 4:
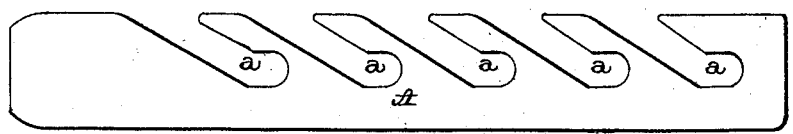

Figure 1 is a plan view, showing the parts ready to be locked. Fig. 2 is a similar view, showing them locked. Fig. 3 is an edge view; Fig. 4, a modification of the plate A.

A represents a plate of suitable length, having a number of openings, *a*, through it, preferably of the form shown, and a hook formed on its outer end for catching in the loop G, by means of which the plate is secured to the strap on the lower end of the hame. Fastened to the lower end of the other part of the hame, by a similar loop, G, is the plate B, which has its inner end decreased in width, and curved, as shown, and to this end is pivoted the lever E, which carries the headed pin F. When it is desired to fasten the two ends of the hames together, the two plates A B are brought together, as shown in Fig. 1, the pin F being passed through one of the holes *a*, and the lever E extending downward. The lever E is then moved outward and around until the pin strikes against the lower edge of the curved end of the plate B, thereby drawing the two plates toward each other and forcing the pin into the smaller end of one of the holes *a*, where it is safely held until the lever is released.

Instead of the holes *a* shown in Figs. 1 and 2, the diagonal slots shown in Fig. 4 may be made in the plate A.

Having thus described my invention, I claim—

In a hame-fastener, the plate A, having the holes or diagonal slots *a*, in combination with the plate B, provided with the pivoted lever E, having the headed pin F, substantially as shown.

DE WITT C. MEEKER.

Witnesses:
F. F. D. ALBERG,
J. V. LEE.